June 28, 1960  P. J. HARNEY  2,942,472
VORTEX AIR THERMOMETER

Filed June 5, 1959  3 Sheets-Sheet 1

INVENTOR.
PATRICK J. HARNEY
BY
ATTORNEYS

June 28, 1960 P. J. HARNEY 2,942,472
VORTEX AIR THERMOMETER
Filed June 5, 1959 3 Sheets-Sheet 2
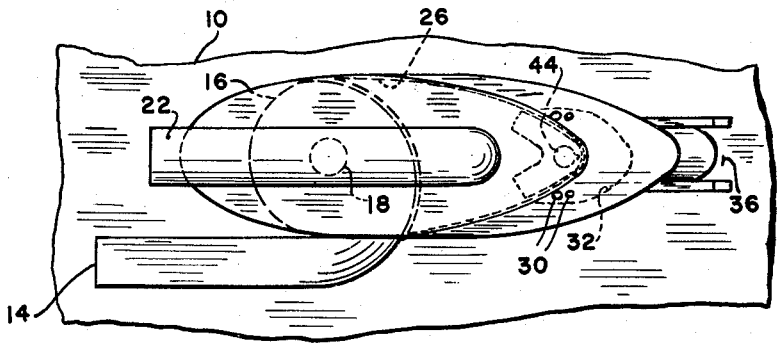
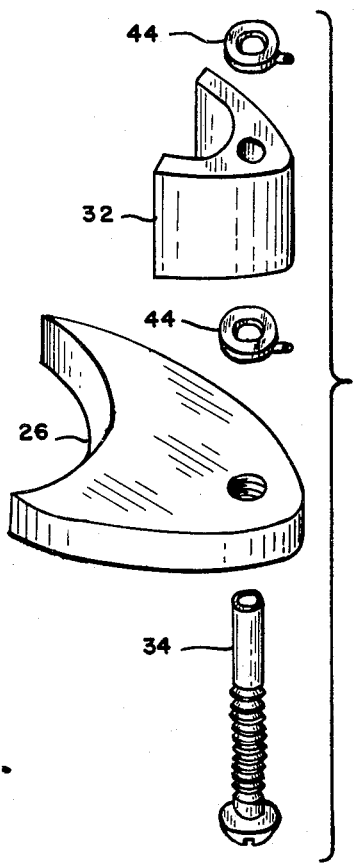
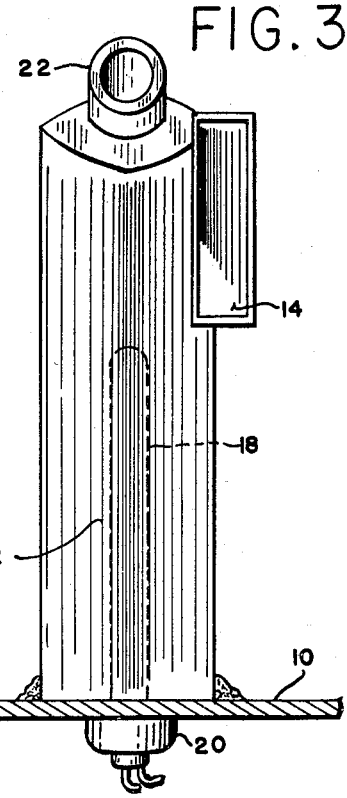
INVENTOR.
PATRICK J. HARNEY
BY
ATTORNEYS June 28, 1960 P. J. HARNEY 2,942,472
VORTEX AIR THERMOMETER
Filed June 5, 1959 3 Sheets-Sheet 3

INVENTOR.
PATRICK J. HARNEY
BY Wade Loomis
Arnold H. Cole
ATTORNEYS

United States Patent Office 2,942,472
Patented June 28, 1960

2,942,472

VORTEX AIR THERMOMETER

Patrick J. Harney, Cambridge, Mass.

Filed June 5, 1959, Ser. No. 818,492

6 Claims. (Cl. 73—349)

(Granted under Title 35, U.S. Code (1952), sec. 266)

The invention described herein may be manufactured and used by or for the United States Government for governmental purposes without payment to me of any royalty thereon.

This invention relates to an improved vortex air thermometer for use on modern aircraft, or on any vehicle having air in motion relative thereto, to measure the temperature of the outside air directly without the necessity of applying large corrections due to variations in air speed and altitude. It makes use of the Ranque effect which is explained in a patent issued to G. J. Ranque, 1,952,281. This shows that the spinning of an air stream in a tube causes the air on the periphery of the vortex to be heated and at the center of the vortex to be cooled, due to centrifugal expansion. By locating a thermometer at the correct point on the axis of the vortex of the spinning air, the true temperature of the surrounding air will be shown since the original compressional heating of the air is compensated for by the cooling effect.

In determining the true temperature of the air through which a plane or other vehicle is passing, many difficulties present themselves. The air, as it flows past the thermometer, tends to heat the latter and give a false reading. Also the thermometer is heated by direct radiation and by conduction unless means are used to prevent it. Several attempts have been made to correct this heating of the air through the use of a vortex thermometer employing the Ranque effect. None have been completely successful due mainly to the fact that as the speed of the plane varies, and the pressure of the air varies with altitude, errors are introduced.

It is an object of this invention to overcome these difficulties by providing a streamlined probe which combines in one housing tangential and axial flow of the air to be measured. Thus the limitations of the present devices, such as non-linearity, change with altitude, difficulty in adjustment and construction, and sensitivity to rain and to icing can be overcome.

Another object of this invention is to balance the pressure forces operating the vortex so that changes of speed and density which affect the performance of the probe can be automatically compensated for. Perfect compensation will mean that the temperature registered by the temperature sensitive element will be that of the free air. As will be shown later, this compensation comes from the use of properly arranged and designed inlets and outlets and also from the combination of both a tangential and an axial flow of air.

Another object of the invention is to establish a noncritical region along the axis of the vortex for the placement of the thermometer.

Another object of the invention is the provision of a control which is accessible for adjustment while the plane is in flight.

Another object of the invention is to minimize the effect of moisture and ice deposition on measurement of the dry air temperature by the proper location of moisture and ice deposition surfaces.

Still another object of the invention is to shield the element against radiation and handling damage and to provide clearance to reduce thermal conductivity errors and lag.

A still further object of the invention is the streamlining of the external structure of the probe and the inclination thereof at a forward angle to the axis of the plane. This serves to increase the speed of the air leaving the probe and to minimize the effect of the probe on the performance of high speed aircraft.

The above and still other objects, advantages and features of my invention will become apparent upon consideration of the following detailed description of one embodiment thereof, especially when taken in conjunction with the accompanying drawings, in which:

Fig. 2 is a top view looking down on the device;

Fig. 3 is a front view of the device;

Fig. 4 is an exploded view of the valve assembly;

Figure 1:
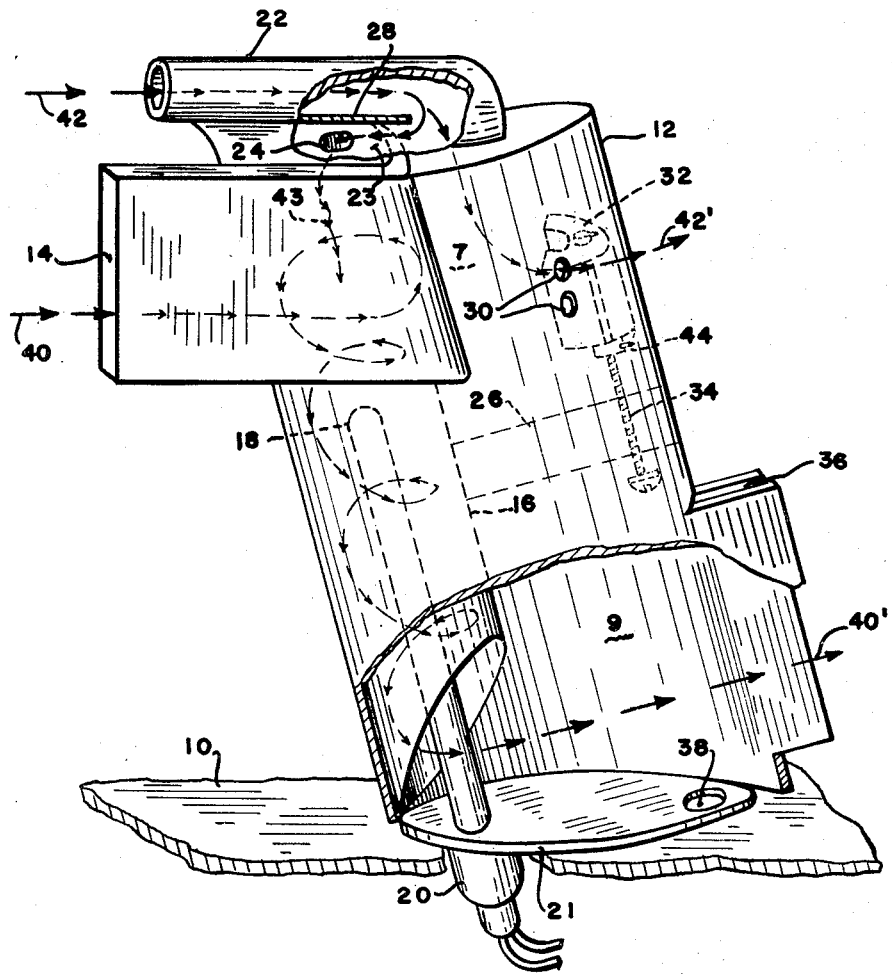
Fig. 1 is a partial isometric view showing the construction of the device.

In the figures the numeral 10 indicates the skin of an airplane or other vehicle having a probe, said probe including a casing or shell 12. The mounting may be by welding or by nuts and bolts (not shown). The said casing 12 is divided by a wall 26 into two non-communicating chambers, the one designated as 7 being referred to as the outer and the one designated as 9 being referred to as the inner chamber. Inside the casing 12, and tangent to its forward walls, is soldered, or otherwise secured, a cylindrical tube 16. A throat 14, opening forward into the slip stream of the vehicle, is mounted tangentially to said tube 16 at the outer end thereof so that a stream of air entering the said tube through the throat 14 will be caused to spin, forming a vortex. The inner end of said tube, cut at an angle as shown, opens into inner chamber 9. Said chamber has an outlet 36 opening rearwardly from said probe. This creates an area of low pressure in chamber 9 with respect to the air entering throat 14, and the spinning air in said tube 16 is therefore sucked out through said opening 36 as shown by dotted arrow 40'. The outer end of tube 16 is closed by a cap 23, in the center of which is provided an orifice 24. Mounted above cap 23 is an air scoop 22. This scoop faces forwardly into the air stream and discharges into chamber 7. The lower wall 28 of said scoop extends beyond said cap 23 and forms a cavity, above orifice 24, communicating with said chamber 7. In the back wall of chamber 7 are cut one or more ports 30 (four are shown) which may be closed by a valve 32. A screw 34, threaded in wall 26, is free to turn in said valve and held in place in said valve by lockwashers 44. This provides manual control of said valve from the inside of the plane by inserting a screw driver through a hole 38 located in the base 21 of said casing. A solid arrow 40 is shown pointing into the said throat 14 and thereafter the dotted arrows show the course of the stream of air and its whirling motion as it passes through tube 16 and out of the said opening 36 at 40'. A gland 20, mounted in base 21, supports a thermometer 18, which could be of the mercury or any other type registering at a distance, in the center of said tube 16. An arrow at 42 shows a stream of air entering the air scoop 22, and thereafter dotted arrows show the course of this stream of air through the device. The stream of air divides, part of it passing into the upper chamber 7 of the said shell and out through the ports 30, and part of it, shown by the dotted arrows 43, goes through the orifice 24 into the center of the vortex of air in tube 16.

Figure 5:
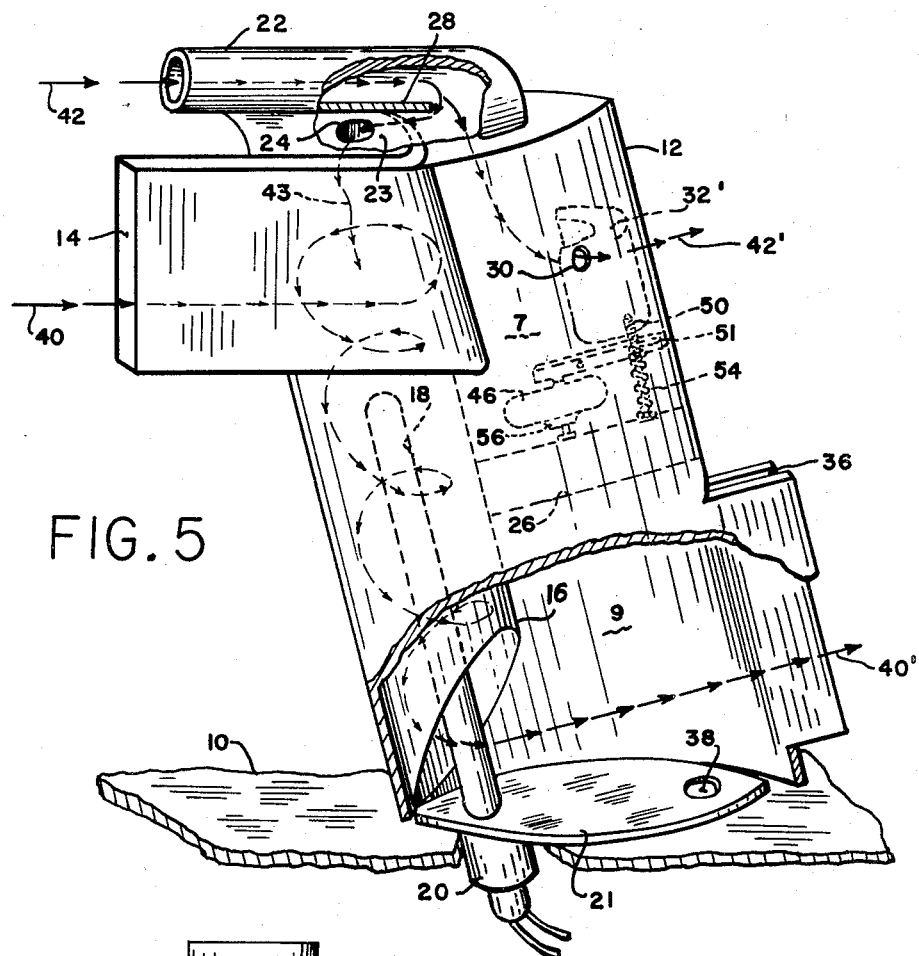
Fig. 5 is a view similar to Fig. 1 and also including a pressure sensitive device for moving the regulating valve.
Figure 6:
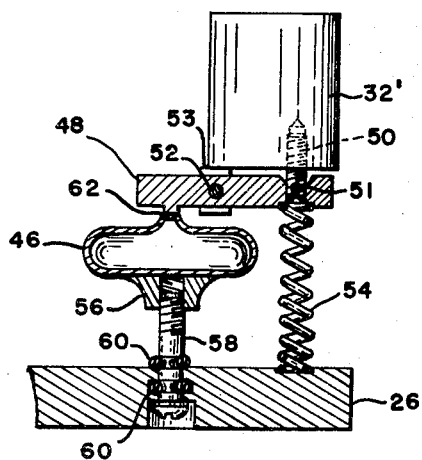
Fig. 6 is a partial sectional view of said pressure sensitive device.

An alternate method of controlling the amount of air admitted to orifice 24 is shown in Fig. 5, and in more detail in Fig. 6. A pressure sensitive bellows 46 is shown welded at 62 to a lever arm 48. The latter is pivoted at 52 to a stud 53 attached to the wall of the casing 12. The lever arm 48 is also pivoted to the valve 32' by a pivot 51 in a screw 50 threaded into valve 32'. A light coil spring 54 is shown balancing the valve and lever arm against the pressure of bellows 46, said spring having just enough pressure to hold the valve in place under calibrated conditions. A threaded bushing 56 is soldered or otherwise fastened to the lower part of bellows 46. A screw 58 is threaded into said bushing and fitted into a hole in wall 26. Said screw is held in place by split rings 60 which fit into slots cut in said screw and said wall. When screw 58 is turned, it will adjust said bellows so as to move said valve 32' in respect to the port or ports 30, opening or closing them as may be required.

Operation of the device is as follows:

Air in the slipstream shown by the solid arrow 40 enters the throat 14. This air is led tangentially to the circumference of the tube 16, being forced to rotate by the curved rear wall of said tube. The air spins rapidly at a speed dependent upon its distance from the center of rotation and upon the entrance and exhaust pressures. The centrifugal force generated drops the pressure at the center, and the temperature there is lowered as shown by Ranque. (The temperature of the air entering at 14 was originally increased adiabatically by the dynamic pressure rise due to the airspeed.) A thermometer 18 positioned at a preselected point on the axis of the rotating column of air will give a reading approximately the same as the outside air temperature. The air leaves through a streamlined exhaust duct 36 located in a low pressure region rearwardly of casing 12. The refrigeration of the air at the core of the vortex depends upon the construction and the tolerances present, so provision of a control to get precisely the cooling desired is furnished here by a unique pneumatic feature. The orifice 24 at the entrance end of the vortex tube 16 feeds a small amount of ram pressure air obtained from the scoop 22. Wall 26 isolates this source from the regular exhaust air in chamber 9, and wall 28 keeps the ram pressure air from entering the orifice 24 directly. This reversal of flow in the airstream before it reaches 24 keeps precipitation from directly affecting the air in the vortex tube. Any precipitation will collect in the chamber 7 and, together with the greater percentage of the air supplied by scoop 22, will leave through the exhaust ports 30. Moisture in the air entering tube 16 will be precipitated on the walls of the tube, fall to the bottom, and be blown out through 36 by the exhaust air. The amount of air entering the orifice 24 is controlled by adjustment of valve 32 by means of screw 34. This serves to regulate the flow of air through chamber 7, and therefore its pressure. This valve may also be moved by a pressure sensitive device, one embodiment of which is shown in Figs. 5 and 6. Note that the mixing of the ram pressure air directly into the core of the vortex supplies a source of warm air to the colder core of the vortex as measured by thermometer 18. Note also that by suitable dimensions of scoop 22 and exhaust ports 30, a venturi action is possible. Such action will remove cold air from the vortex in tube 16 through orifice 24. As a result of the combination of the warm ram pressure air and the cool air in the vortex tube, the compensation forces balance the disturbing influences and provide a calibration which holds over a wide range of variables. Fig. 1 shows the accessibility of screw 34 for manual adjustment of valve 32 from the inside of the aircraft through hole 38. The coarse adjustment of the thermometer is made by selecting a favorable position on the axis of the vortex of air. The gland support 20 allows this to be accomplished in flight.

When the thermometer is placed in the tube so that it coincides with the axis of the vortex of air, it will register the temperature of the cooler air in the center of said vortex. If the dimensions of the inlet throat 14 and the outlet 36 are such that the true temperature of the outside air is indicated on the thermometer, said thermometer will thereafter register the correct temperature under static conditions. When the plane is in flight, and especially when it rises to higher altitudes or increases its speed, the reading of the thermometer may vary from the true value.

A further calibrating means is necessary and is provided by the unique pneumatic feature mentioned above. As the air passes through scoop 22, it is heated by pressure and friction. The regulated amount of this heated air entering the cooled center of the vortex of air in tube 16 compensates the reading of the thermometer. When the plane is taken aloft, and the temperature of the air and the speed of the plane are known, the screw 34 is turned by a screw driver until the thermometer reads correctly. The probe is then calibrated and will give a true reading of the outside air under widely varying conditions of speed and altitude. For greater range of compensation an alternate method of controlling the ram pressure air from scoop 22 into the center of the vortex is shown in Fig. 5. Essentially it consists of a bellows 46 which may be partly evacuated. Upon reaching higher altitudes the bellows will expand and, through lever 48 pinioned at 52, will move the valve 32'. The port or ports 30 may then be further opened or closed depending on the position of the valve 32' in relation thereto. If it should be found that at extreme altitudes, or at ultra high speeds, more air is needed for compensation, the ports 30 could be further closed by valve 32'. If it should be found that less air is needed for compensation, the valve 32' could be so positioned in relation to the port or ports that they would be further opened.

Thus automatic compensation would be provided by the pneumatic principle disclosed.

What is claimed is:

1. An instrument for measuring the temperature of the air moving in relation to said instrument comprising a streamlined outer casing, a cylindrical tube mounted in said casing, a throat mounted adjacent one end of said tube and admitting air tangentially to said tube to set the air in a spinning motion through said tube, the other end of said tube opening in a direction opposite to the opening of said throat to draw the air through said tube, an orifice in the center of said one end of said tube, means to supply compensating air through said orifice to the cooled vortex of air in the said tube, means to control the amount of air admitted through said orifice, and a temperature sensitive device supported along the axis of said tube to measure the temperature of the air in the vortex.

2. An instrument for measuring the temperature of the air moving in relation to said instrument comprising a streamlined outer casing, a cylindrical tube mounted in said casing, a throat mounted adjacent one end of said tube and admitting air tangentially to said tube to set the air in spinning motion through said tube, the other end of said tube opening in a direction opposite to the opening of said throat to draw the air through said tube, an orifice in the center of said one end of said tube, means to supply compensating air through said orifice to the cooled vortex of air in the said tube, said means comprising an air scoop with an opening facing into the relatively moving stream of air to force air into a chamber communicating with said orifice, means to control the amount of air admitted through said orifice, and a temperature sensitive device supported along the axis of said tube to measure the temperature of the air in the vortex.

3. An instrument for measuring the temperature of the air moving in relation to said instrument comprising a streamlined outer casing, a cylindrical tube mounted in said casing, a throat mounted adjacent one end of said tube and admitting air tangentially to said tube to set the air in spinning motion through said tube, the other end of said tube opening in a direction opposite to the opening of said throat to draw the air through said tube, an orifice in the center of said one end of said tube, means to supply compensating air through said orifice to the cooled vortex of air in the said tube, said means comprising an air scoop with an opening facing into the relatively moving stream of air to force air into a chamber communicating with said orifice, means to control the amount of air admitted through said orifice, said means comprising a valve operated from the outside of said casing to control at least one port in said chamber to vary pressure therein, and a temperature sensitive device supported along the axis of said tube to measure the temperature of air in the vortex.

4. An instrument for measuring the temperature of the air moving in relation to said instrument comprising a streamlined outer casing, a cylindrical tube mounted in said casing, a throat mounted adjacent one end of said tube and admitting air tangentially to said tube to set the air in spinning motion through said tube, the other end of said tube opening in a direction opposite to the opening of said throat to draw the air through said tube, an orifice in the center of said one end of said tube, means to supply compensating air through said orifice to the cooled vortex of air in the said tube, said means comprising an air scoop with an opening facing into the relatively moving stream of air to force air into a chamber communicating with said orifice, means to control the amount of air admitted through said orifice, said means comprising a valve to control at least one port in said chamber to vary pressure therein, said valve being adjustable by a screw threaded in a wall in said casing, said screw being accessible from outside said casing, and a temperature sensitive device supported along the axis of said tube to measure the temperature of the air in the vortex.

5. An instrument for measuring the temperature of the air moving in relation to said instrument comprising a streamlined outer casing, a cylindrical tube mounted in said casing, a throat mounted adjacent one end of said tube and admitting air tangentially to said tube to set the air in spinning motion through said tube, the other end of said tube opening in a direction opposite to the opening of said throat to draw the air through said tube, an orifice in the center of said one end of said tube, means to supply compensating air through said orifice to the cooled vortex of air in the said tube, said means comprising an air scoop with an opening facing into the relatively moving stream of air to force air into a chamber communicating with said orifice, means to control the amount of air admitted through said orifice, said means comprising a valve operated by a pressure responsive bellows acting through a lever arm to control at least one port in said chamber to vary pressure therein, and a temperature sensitive device supported along the axis of said tube to measure the temperature of air in the vortex.

6. An instrument for measuring the temperature of the air moving in relation to said instrument comprising a streamlined outer casing, a cylindrical tube mounted in said casing, a throat mounted adjacent one end of said tube and admitting air tangentially to said tube to set the air in spinning motion through said tube, the other end of said tube opening in a direction opposite to the opening of said throat to draw the air through said tube, an orifice in the center of said one end of said tube, means to supply compensating air through said orifice to the cooled vortex of air in the said tube, said means comprising an air scoop with an opening facing into the relatively moving stream of air to force air into a chamber communicating with said orifice, means to control the amount of air admitted through said orifice, said means comprising a pressure responsive bellows, an arm connected thereto, a valve controlled by said arm to control at least one port in said chamber to vary pressure therein, and a temperature sensitive device supported along the axis of said tube to measure the temperature of air in the vortex.

References Cited in the file of this patent

UNITED STATES PATENTS

| 1,952,281 | Ranque | Mar. 27, 1934 |
| 2,764,023 | Vonnegut | Sept. 25, 1956 |
| 2,826,070 | Box et al. | Mar. 11, 1958 |

FOREIGN PATENTS

| 734,702 | Great Britain | Aug. 3, 1955 |